United States Patent [19]

McClocklin et al.

[11] 4,073,315

[45] Feb. 14, 1978

[54] VALVE ASSEMBLY

[75] Inventors: Samuel B. McClocklin; James C. Solie, both of Owatonna, Minn.

[73] Assignee: Owatonna Tool Company, Owatonna, Minn.

[21] Appl. No.: 761,413

[22] Filed: Jan. 21, 1977

[51] Int. Cl.² .............................................. F16K 1/00
[52] U.S. Cl. ......................................... 137/629; 91/48
[58] Field of Search .................... 91/48; 137/601, 629, 137/630

[56] References Cited

U.S. PATENT DOCUMENTS

| 2,073,751 | 3/1937 | Niesmann | 137/629 |
| 2,381,553 | 8/1945 | Mott | 137/629 |
| 3,631,893 | 1/1972 | Seaman | 137/630 |
| 3,934,610 | 5/1974 | Solie | 137/596.12 |

Primary Examiner—Robert G. Nilson
Attorney, Agent, or Firm—Wegner, Stellman, McCord, Wiles & Wood

[57] ABSTRACT

A valve assembly with decompression means having a valve body with a pressure port, a return port and a control port with internal passages connecting the ports, and a pair of valves within said body arranged in parallel and operable when closed to block the flow from the control port to the return port, the valves being operable in sequence with a first of the valves openable to slowly reduce the pressure in said internal passages and the second valve being openable thereafter to permit a substantial flow from the control port to the return port. A force-multiplying system includes plural levers and a relatively heavy spring with the spring normally holding the first valve closed whereby actuation of the force-multiplying system causes the application of a force against the relatively heavy spring to permit fluid pressure to open the first valve to reduce the pressure and with the second valve and the spring being related whereby a reduction of pressure in the internal passages to a certain level causes said spring to open the second valve.

14 Claims, 4 Drawing Figures

VALVE ASSEMBLY

BACKGROUND OF THE INVENTION

This invention pertains to a valve assembly with decompression means and, more particularly, to a solenoid-operated valve assembly that will direct pressure fluid to a control port connectable to a cylinder or the like and hold pressure at the cylinder when flow to the inlet port is stopped. When the solenoid is energized the pressure of the fluid is reduced slowly from high pressure to low pressure, with this being accomplished by decompression means and, thereafter, the valve assembly is opened fully to allow free flow from the cylinder to the control port and from there to a return port leading to a reservoir. Additionally, a leverage system is used to achieve the necessary force for enabling operation of the valve assembly by a solenoid.

Control valves for controlling the flow to a cylinder and for holding pressure in the cylinder are known. For example, such a structure is shown in Solie U.S. Pat. No. 3,934,610. The valve disclosed in the Solie patent includes means for reducing the pressure held in the cylinder prior to complete opening of the flow path from a control port to the return port. The Solie patent discloses operation of the decompression means and valve structure either by hydraulically-powered pilot members or by a hand lever.

The Mott U.S. Pat. No. 2,381,553 discloses a control valve with two different valve members operable in sequence determined by the stroke of an operating member for first reducing a pressure and then opening a main flow path to a return port.

The above prior art does not disclose a valve assembly having a force-multiplying leverage system enabling operation of valve components directly by a solenoid nor does the prior art show a system wherein opening of a main valve to permit flow from a control port to a return port is directly responsive to the value of the reduced pressure within the valve.

It is also known in the art to use a pair of interacting levers to open a valve in response to operation of a solenoid.

SUMMARY

A primary feature of the invention disclosed herein is to provide a valve assembly with decompression means which is operable to permit flow to a cylinder and to hold pressure in the cylinder with decompression means to slowly reduce the held pressure from a relatively high pressure to a lower pressure followed by full opening of the valve to allow free flow from the cylinder to a reservoir and with a force-multiplying leverage system enabling operation of the valve assembly by a fast-acting solenoid.

Another feature of the invention is to provide a valve assembly with decompression means wherein a valve body has a pressure port, a return port and a control port with internal passages connecting said ports and having a pair of valves therein, with a first valve constituting decompression means whereby opening of said first valve permits a relatively slow reduction in pressure held by the valve assembly followed by opening of a second valve permitting free flow through the valve assembly to the reservoir and with a force-multiplying leverage system operably connected to both of said valves, whereby initial movement of said system opens the first valve to permit slow reduction of fluid pressure and, after a certain level of reduced fluid pressure is reached, the system causes opening movement of the second valve for free fluid flow.

Still another feature of the invention is to provide a valve assembly as defined in the preceding paragraph operable by a solenoid and with the decompression valve member being of a small size and held against pressure by a relatively heavy spring associated with the force-multiplying leverage system whereby actuation of the solenoid operates the leverage system to compress the spring to permit opening of the decompression valve member in response to pressure being held by the valve assembly and with the force exerted by said spring also acting on the relatively large valve member of the second valve which is normally held closed by pressure whereby a reduction of the high pressure to a lower value reduces the force holding the second valve member closed to a level whereby said spring may act on the leverage system to open the second valve and permit free flow from the control port to the return port of the valve assembly.

DESCRIPTION OF THE PREFERRED EMBODIMENT

Figure 1:
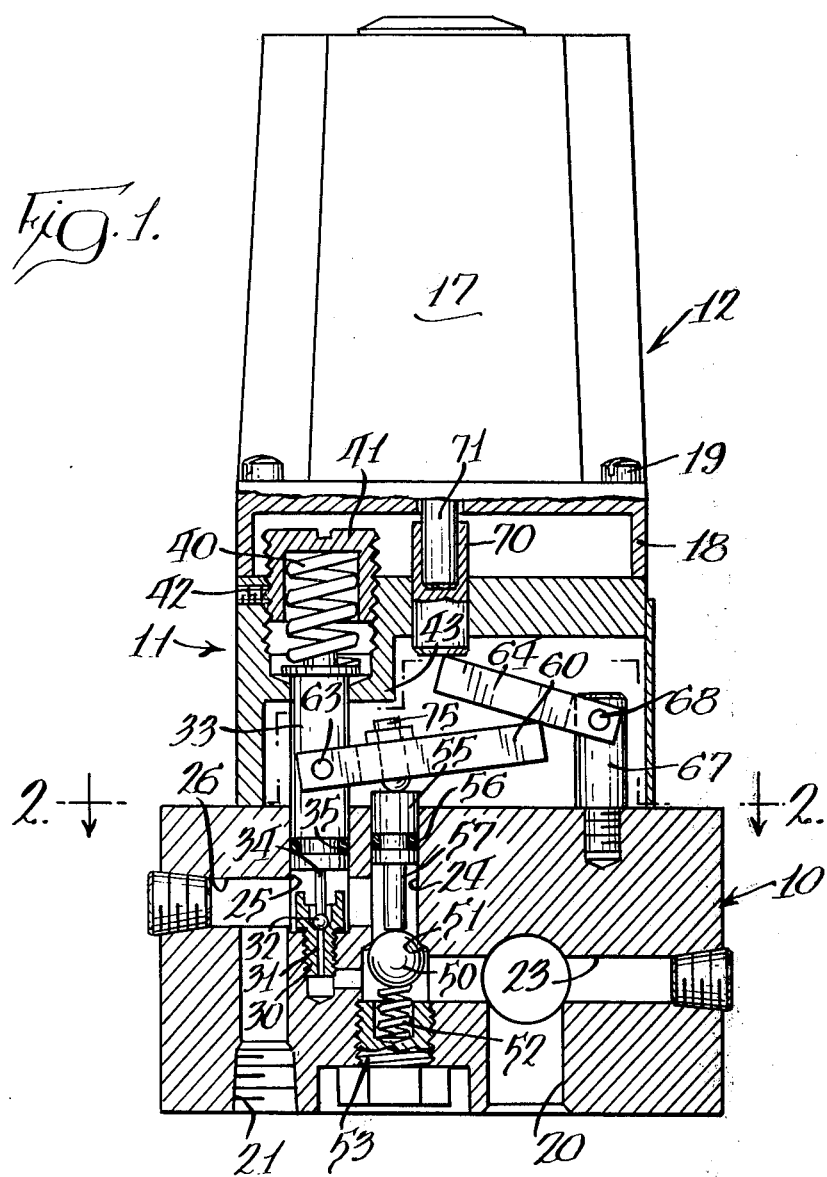
FIG. 1 is a side elevational view of the valve assembly with the valves closed and with parts thereof shown in central vertical section.
Figure 2:
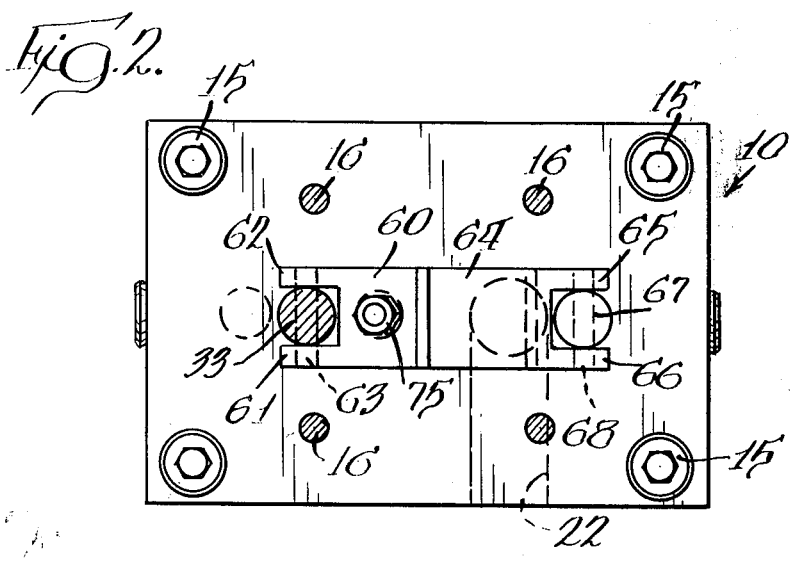
FIG. 2 is a plan view taken generally along the line 2—2 in FIG. 1.

The valve assembly is shown generally in FIG. 1 and includes a valve body, indicated generally at 10, having a linkage block, indicated generally at 11, positioned thereon and a solenoid, indicated generally at 12, positioned above the linkage block 11. The valve assembly may be mounted to suitable structure by attachment means 15 extending therethrough and as shown in FIG. 2. The linkage block 11 is secured to the valve body 10 by attachment means 16 shown in section in FIG. 2 and which extend through the linkage block and are connected to the valve body 10. The solenoid 12 has a cover 17 with a lower peripheral wall 18 resting on the linkage block and having attachment means 19 extended through the lower end of the solenoid housing for attachment to the linkage block.

The valve body 10 has an inlet port 20, a return port 21 and a control port 22. Internal passages including a passage 23, passages defined by a valve bore 24 and a valve bore 25, and an interconnecting passage 26 connect the inlet port, return port and control port. Each of the passages 23 and 26 have one end plugged. With the inlet port 20 connected to a source of fluid under pressure, such as a pump, there is flow to the inlet port 20 and through the control port 22 to a cylinder or the like. During flow to a cylinder, valve means positioned in the valve bores 24 and 25 prevent flow to the return port 21. When the supply of fluid to the inlet port 20 is terminated, pressure is held in the control port 22 and the cylinder by the above-mentioned valves which block the flow to the return port 21 and by means of an additional check valve (not shown) which may be positioned at the inlet port 20 to prevent reverse flow or may be associated with the pump supplying fluid to the valve.

A first valve which is positioned in the valve bore 25 includes a valve seat member 30 which is threaded into a threaded reduced diameter section of the valve bore 25. The valve seat member has a small diameter passage 31 extending therethrough to be in flow communication with a reduced diameter end of the internal passage 23 to permit flow upwardly, as shown in FIG. 1, to a valve seat normally closed by a small poppet valve member 32 in the form of a spherical member. The position of the poppet valve member 32 is controlled by stem 33 extending upwardly out of the valve bore 25 and having a small diameter lower end 34 engageable against the valve member 32. The stem is sealed against the wall of the valve bore by an O-ring 35. The stem is urged downwardly, as viewed in FIG. 1, by a relatively heavy spring 40 engaged between an upper end of the stem and a cup-shaped spring retainer 41 threaded into the linkage block 11 and held in adjusted position by a lock member 42. The linkage block has a recess to house the spring and receive the spring retainer with a wall 43 thereof having an opening to slidably receive the stem and assist in guiding thereof.

The first valve functions as decompression means for slowly reducing the pressure of fluid held in a cylinder connected to the control port 22. The poppet valve member 32 is held in closed position by the relatively heavy spring 40 against a force exerted by fluid pressure. When the force exerted by the spring 40 is reduced in a manner to be described, fluid pressure acting on the poppet valve member 32 exerts a force to move the poppet valve member from its seat and open the flow passage 31 whereby flow from the cylinder may pass through the internal passages 23 and 26 to the return port 21. The rate of flow in reducing the fluid pressure from a high value to a lower value is determined by the diameter of the flow passage 31 and this passage may be made quite small by insertion of a pin (not shown) within the flow passage 31 whereby actual flow is in the space between the pin and the wall of the flow passage 31.

A second valve positioned in the valve bore 24 to be in parallel relation with the first valve has a poppet valve member 50 which is shown as a spherical member having a much larger diameter than the poppet valve member 32. The poppet valve member 50 is urged against a valve seat 51 by a spring 52 held in position by a threaded closure member 53 threaded into the lower end of the valve bore 24. The poppet valve member 50 is also held against its seat by the force of fluid pressure existing in the cylinder and the internal passage 23. An operating stem 55 is movably mounted in the valve bore 24 and sealed thereto by an O-ring 56 with a reduced diameter lower end 57 of the valve stem engaging the poppet valve member 50. When the valve operating stem 55 is lowered, the poppet valve member 50 moves away from the valve seat 51 whereby there is flow from the internal passage 23 through the valve bore 24, the right-hand end of the internal passage 26, and the valve bore 25 to the return port 21.

The force-multiplying leverage system for operation of the first and second valves, includes the spring 40 and a pair of interacting levers. A first lever 60 has a bifurcated end with parts 61 and 62 thereof spanning the valve-operating stem 33. A pivot pin 63 extends through these parts and the stem to pivotally mount the first lever to the stem. A second lever 64 has a bifurcated end whereby parts 65 and 66 thereof span a post 67 fixedly mounted to the valve body. The second lever is pivoted to the post by a pivot pin 68. The second lever has a free end positioned beneath an extension member 70 for a solenoid plunger 71 with the extension member 70 movably guided in an opening in the linkage block whereby downward movement of the solenoid plunger 71 causes downward movement of the extension 70 to depress the free end of the second lever 64. The second lever 64 overlies a free end of the first lever 60 whereby downward movement of the second lever 64 results in forces applied to the first lever 60. The first lever 60 has an adjustable screw 75 mounted therein intermediate its ends and located between the middle of the first lever 60 and the pivot connection of this lever to the valve stem 33. The adjusting screw 75 is adjustable in order to enable positioning of the parts as shown in FIG. 1 to have the upper end of the second lever 64 positioned to just clear the lower end of the actuator extension 70.

Figure 3:
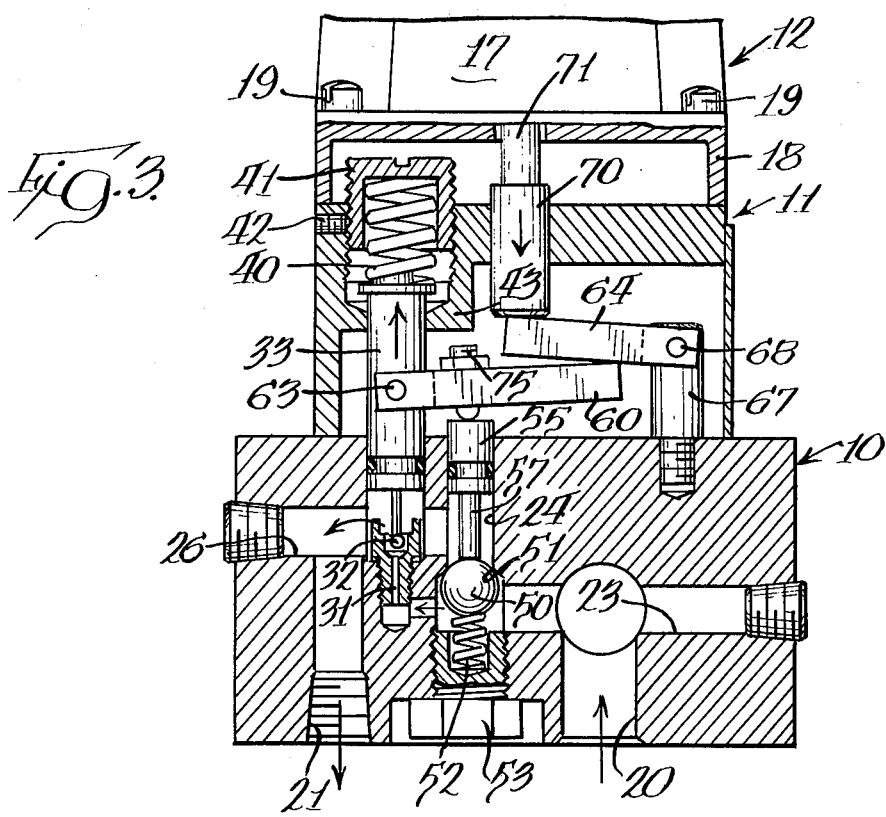
FIG. 3 is a fragmentary view, similar to FIG. 1, showing the components of the valve assembly positioned for reducing the pressure of fluid.

When the valve assembly is in circuit with a pump and a cylinder, the lowering movement of the solenoid plunger 71 and extension 70 positions the valve assembly in the position shown in FIG. 3. The second lever 64 is pivoted downwardly in a counterclockwise direction with resulting clockwise pivoting of the first lever 60. Prior to this movement, a relatively high pressure exists in the internal passage 23 of the valve body whereby a relatively large force is created by fluid pressure acting on the second valve poppet valve member 50 so that the operating stem 55 does not move. As a result, movement of the first lever 60 is about the adjustable screw 75 as a fulcrum to cause lifting of the operating stem 33 to compress the relatively heavy spring 40. This action releases the spring force acting on the poppet valve member 32 to permit upward movement of the poppet valve member 32 caused by fluid pressure. A relatively slow flow rate through the flow passage 31 to the return port, as shown by flow arrows, causes a slow reduction of the fluid pressure from a relatively high value to a lower value.

Figure 4:
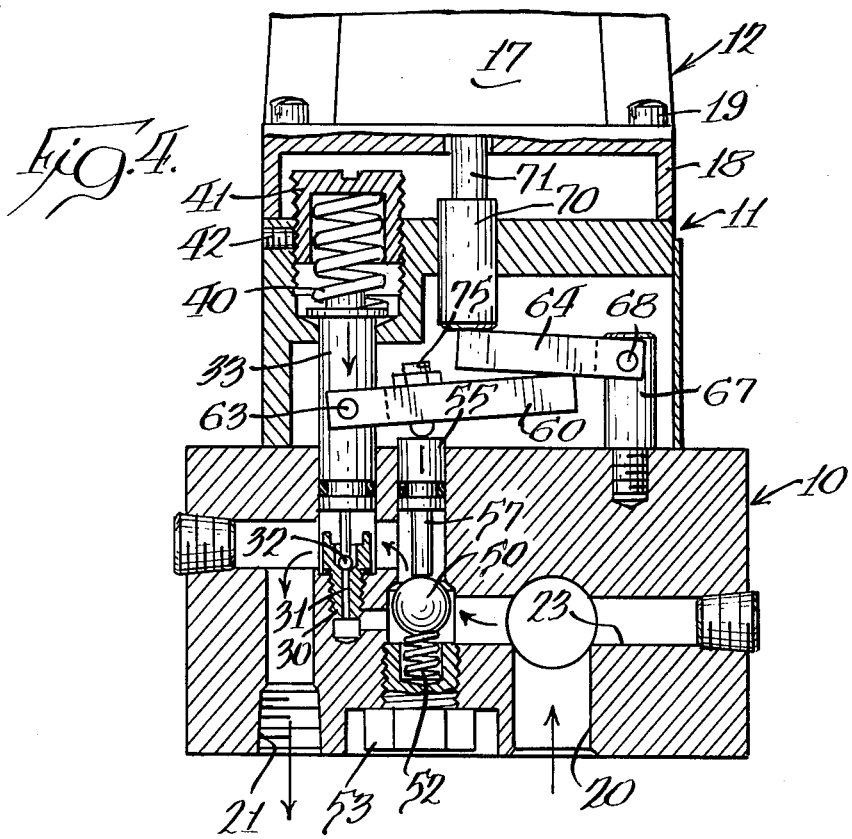
FIG. 4 is a view, similar to FIG. 3, showing the components of the valve assembly positioned to permit free flow from a control port to a return port.

At a predetermined lower pressure value, the valve assembly moves to the position shown in FIG. 4. The second lever 64 is still depressed; however, the force acting on the poppet valve member 50 to hold the valve member against its seat is reduced because of the reduced fluid pressure. At a certain pressure level, the force exerted by the relatively heavy spring 40 overcomes the fluid pressure force acting on poppet member 50, as well as the force of spring 52, to lower the operating stem 33 and the first lever 60 (the engagement between the levers defining a fulcrum for pivoting of the first lever) with the result that the small poppet member 32 closes and the large poppet valve member 50 opens by the action of adjustable screw 75 against the operating stem 55 to permit free flow to the return port, as shown by the flow arrows in FIG. 4.

With the positioning of the adjusting screw 75 adjacent the pivot location of the first lever 60 to the operating stem 33, there is almost an equal movement of operating stems 33 and 35 in moving from the position of FIG. 3 to the position of FIG. 4, whereby there is a maximum amount of lowering movement of the operating stem 55 for moving the large poppet valve member 50 away from the valve seat 51. This structural relation also maximizes the leverage in movement of the valve assembly to the position shown in FIG. 3.

Upon de-energization of the solenoid, the spring 52 acts to close the large poppet member 50 and move the operating stem 55 upwardly which raises the first lever 60 to cause the second lever 64 to return to the initial position shown in FIG. 1.

With the structure disclosed herein, the valve assembly may be solenoid-operated with the solenoid operating through its full stroke almost instantaneously and without there being a resultant fast opening of the valve. The slow opening is provided by the use of the decompression means provided by the first valve which permits a slow reduction of the fluid pressure. The slow reduction in pressure assures that there will be no danger from fast movement of the cylinder which might be connected to mechanism which could cause injury if movement thereof were too fast. Additionally, the structure disclosed herein provides for opening the first valve against the action of a relatively heavy spring which functions to provide the opening movement of the second valve for full return flow after a reduced pressure has been reached. These actions are derived through a force-multiplying leverage system including levers which enable operation by a solenoid of reasonable size which would not have sufficient force to open the valve directly.

We claim:

1. A valve assembly with decompression means comprising, a valve body having a pressure port, a return port, a control port, and internal passages connecting said ports, a pair of valves within said body arranged in parallel and operable when closed to block flow from the control port to the return port, a first of said valves having a relatively small valve member held in closed position against fluid pressure, means including a relatively heavy spring acting on said small valve member, a second of said valves having a relatively large valve member urged to closed position by fluid pressure, a force-multiplying system including a first lever operatively connected to both said valve members and a second lever engageable with said first lever and operable in response to an applied force to cause said first lever to act against said relatively heavy spring whereby the valve member of said first valve may open to connect the control port to the return port and after a reduction in fluid pressure said relatively heavy spring moves said first lever to open the valve member of the second valve.

2. A valve assembly as defined in claim 1 including a solenoid having a plunger engageable with said second lever to provide said applied force.

3. A valve assembly as defined in claim 1 wherein said first valve has a flow passage of a relatively small cross section to limit the rate of flow to the return port when the valve member of the first valve opens.

4. A valve assembly as defined in claim 1 wherein said valve members of the first and second valves are poppet valves.

5. A valve assembly as defined in claim 4 wherein said poppet valves are spherical.

6. A valve assembly as defined in claim 1 wherein a movable stem interconnects the valve member of the first valve and said relatively heavy spring with said first lever having an end pivoted on said stem, the opposite end of said first lever engaging said second lever, and a movable stem for operating the valve member of the second valve and engageable with the first lever intermediate its ends.

7. A valve assembly as defined in claim 6 wherein the engagement of the movable stem for the second valve with the first lever is between the middle of the first lever and the pivoted end thereof and defines a fulcrum whereby movement of the second lever pivots the first lever about the fulcrum and against the force of the relatively heavy spring to open the first valve member, and thereafter the heavy spring moves the pivoted end of the first lever and the movable stem for the second valve member substantially the same amount to open the second valve member with the engagement of said first lever end with the second lever defining a fulcrum.

8. A solenoid valve assembly having a valve body with a pressure port, a return port, and a control port, passage means in said body connecting said ports, first and second valves in said body arranged in parallel in said passage means for blocking fluid flow between the control port and the return port, a solenoid operable to open said valves, and means interconnecting said solenoid and said first and second valves including first and second levers and a spring whereby initial movement of said levers by operation of the solenoid opens said first valve against the action of said spring and after a reduction of fluid pressure said spring acts to open said second valve.

9. A solenoid valve assembly as defined in claim 8 wherein each of said first and second valves has a poppet valve member with the first valve poppet member urged to a closed position against fluid pressure by said spring, and the second valve poppet member urged to a closed position by fluid pressure, and said spring acting through said first and second levers to urge said second valve poppet member to open position.

10. A solenoid valve assembly as defined in claim 8 wherein said first valve has a relatively small flow passage when open to permit a relatively slow rate of fluid flow to the return port and cause a slow reduction in fluid pressure.

11. A solenoid valve assembly having a valve body with a pressure port, a return port and a control port, passage means interconnecting said ports including first and second parallel passages opening to a face of said body, a first valve in the first of said parallel passages including a valve seat member with a relatively small flow passage and a relatively small poppet valve member engageable against said valve seat, a second valve in the second of said parallel passages and having a valve seat and a relatively large poppet valve member urged closed by fluid pressure in the passage means, first and second operating stems one in each of the first and second parallel passages for operating the associated valve member, a relatively heavy spring engaging said first stem to urge the poppet valve member of the first valve against its valve seat and against fluid pressure in said passage means, a first lever pivoted at an end thereof to said first stem and intermediate its ends engageable with the second stem, a second lever fixedly pivoted at one end and engageable with the first lever, a solenoid having a plunger engageable with said second lever to pivot the second lever and thereby cause movement of the first lever, the pressure in said passage means acting on the relatively large poppet valve member holding the second stem against movement whereby movement of the first lever is against the force of said spring whereby fluid pressure opens said first poppet valve member to gradually reduce the pressure in said passage means until the force of the spring exceeds the force acting on the relatively large poppet valve member and said first lever is moved to move both valve stems and close the first valve and open the second valve.

12. A solenoid valve assembly as defined in claim 11 including an additional spring acting on said relatively large poppet valve member to close the second valve and restore the levers to an initial position when the solenoid is de-energized.

13. A solenoid valve assembly as defined in claim 12 wherein said first lever carries an adjustable screw engageable with the stem of the second valve for adjusting said initial position of the levers.

14. A solenoid valve as defined in claim 13 wherein said adjusting screw is offset from the middle of the first lever to maximize the leverage in opening said first valve and obtain the maximum opening movement of the second valve as both stems are moved by said relatively heavy spring.

* * * * *